US008712437B2

(12) United States Patent
Schmidt et al.

(10) Patent No.: US 8,712,437 B2
(45) Date of Patent: Apr. 29, 2014

(54) MOBILE COMMUNICATION DEVICE AND METHOD FOR PROVIDING POSITIONING INFORMATION

(75) Inventors: Andreas Schmidt, Braunschweig (DE); Ana Lucia Pinheiro, Breinigsville, PA (US)

(73) Assignee: Intel Mobile Communications GmbH, Neubiberg (DE)

( * ) Notice: Subject to any disclaimer, the term of this patent is extended or adjusted under 35 U.S.C. 154(b) by 1 day.

(21) Appl. No.: 13/422,001

(22) Filed: Mar. 16, 2012

(65) Prior Publication Data
US 2013/0244696 A1 Sep. 19, 2013

(51) Int. Cl.
*H04W 24/00* (2009.01)
*H04W 36/00* (2009.01)
*H04B 7/185* (2006.01)
*H04W 4/00* (2009.01)
*G01S 3/02* (2006.01)

(52) U.S. Cl.
USPC ............... 455/456.2; 455/456.1; 455/440; 455/441; 455/456.3; 455/12.1; 370/332; 342/450

(58) Field of Classification Search
USPC ............................................. 455/456.2
See application file for complete search history.

(56) References Cited

U.S. PATENT DOCUMENTS

| 6,295,454 | B1* | 9/2001 | Havinis et al. | 455/456.3 |
|---|---|---|---|---|
| 2006/0258369 | A1* | 11/2006 | Burroughs et al. | 455/456.1 |
| 2007/0082681 | A1* | 4/2007 | Kim et al. | 455/456.1 |
| 2007/0290923 | A1* | 12/2007 | Norta et al. | 342/450 |
| 2008/0004043 | A1* | 1/2008 | Wilson et al. | 455/456.3 |
| 2008/0133336 | A1* | 6/2008 | Altman et al. | 705/10 |
| 2010/0291950 | A1* | 11/2010 | Lin et al. | 455/456.3 |
| 2012/0172056 | A1* | 7/2012 | Karaoguz | 455/456.1 |
| 2012/0195290 | A1 | 8/2012 | Bienas et al. | |

OTHER PUBLICATIONS

3 GPP TS 37.200 V10.4.0, Dec. 2011, 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10).

* cited by examiner

*Primary Examiner* — Timothy Pham

(57) ABSTRACT

According to an aspect of this disclosure, a mobile communication device is provided comprising a positioning circuit configured to determine the geographical position of the mobile communication device; a requester configured to generate a request for information about the geographical position of the mobile communication device; a location management circuit configured to receive an indication of the determined geographical position of the mobile communication device from the positioning circuit; receive the request from the requester, process the request and provide information about the geographical position of the mobile communication device based on the result of the processing of the request and based on the indication of the geographical position of the mobile communication device to the requester.

24 Claims, 9 Drawing Sheets

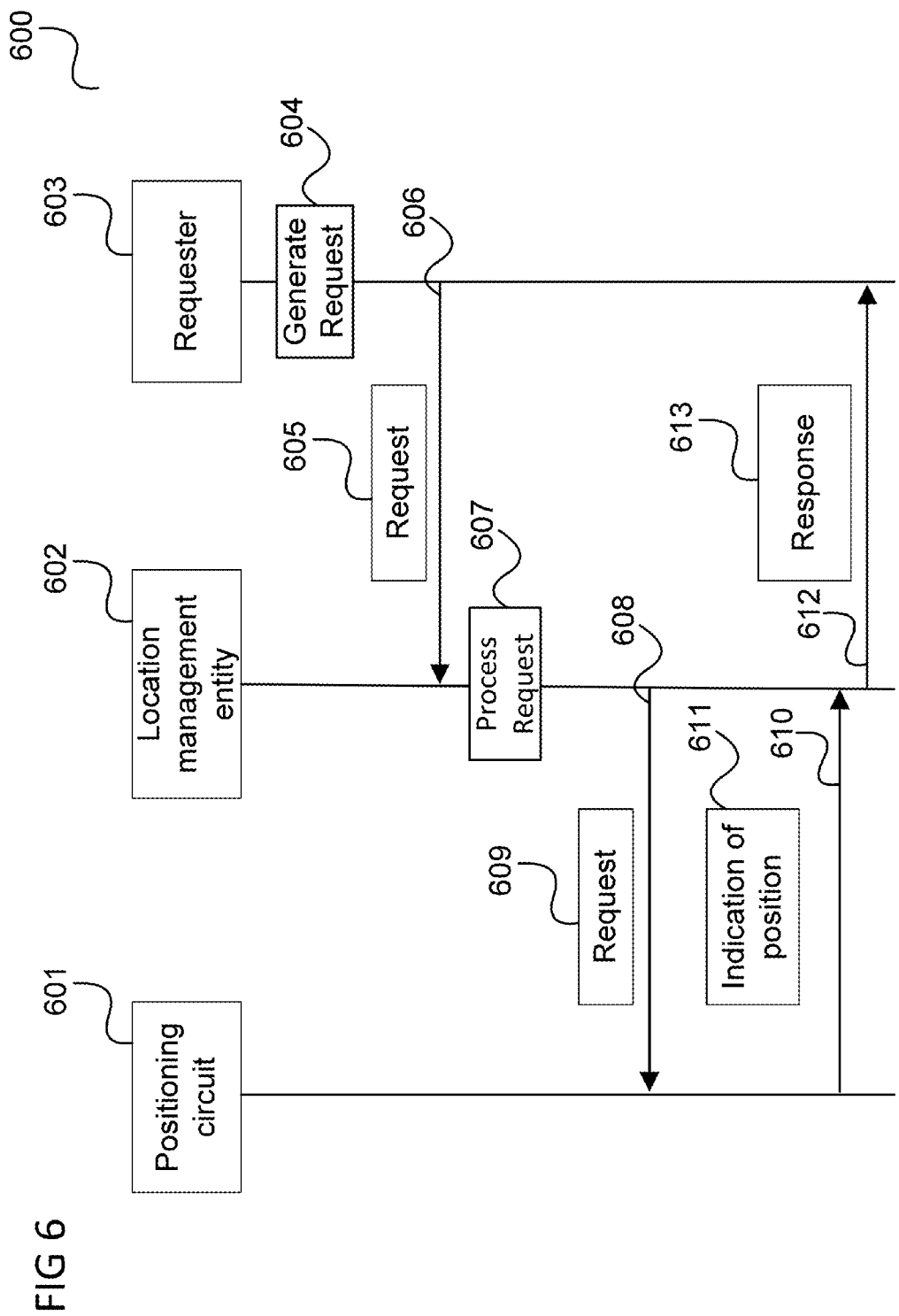

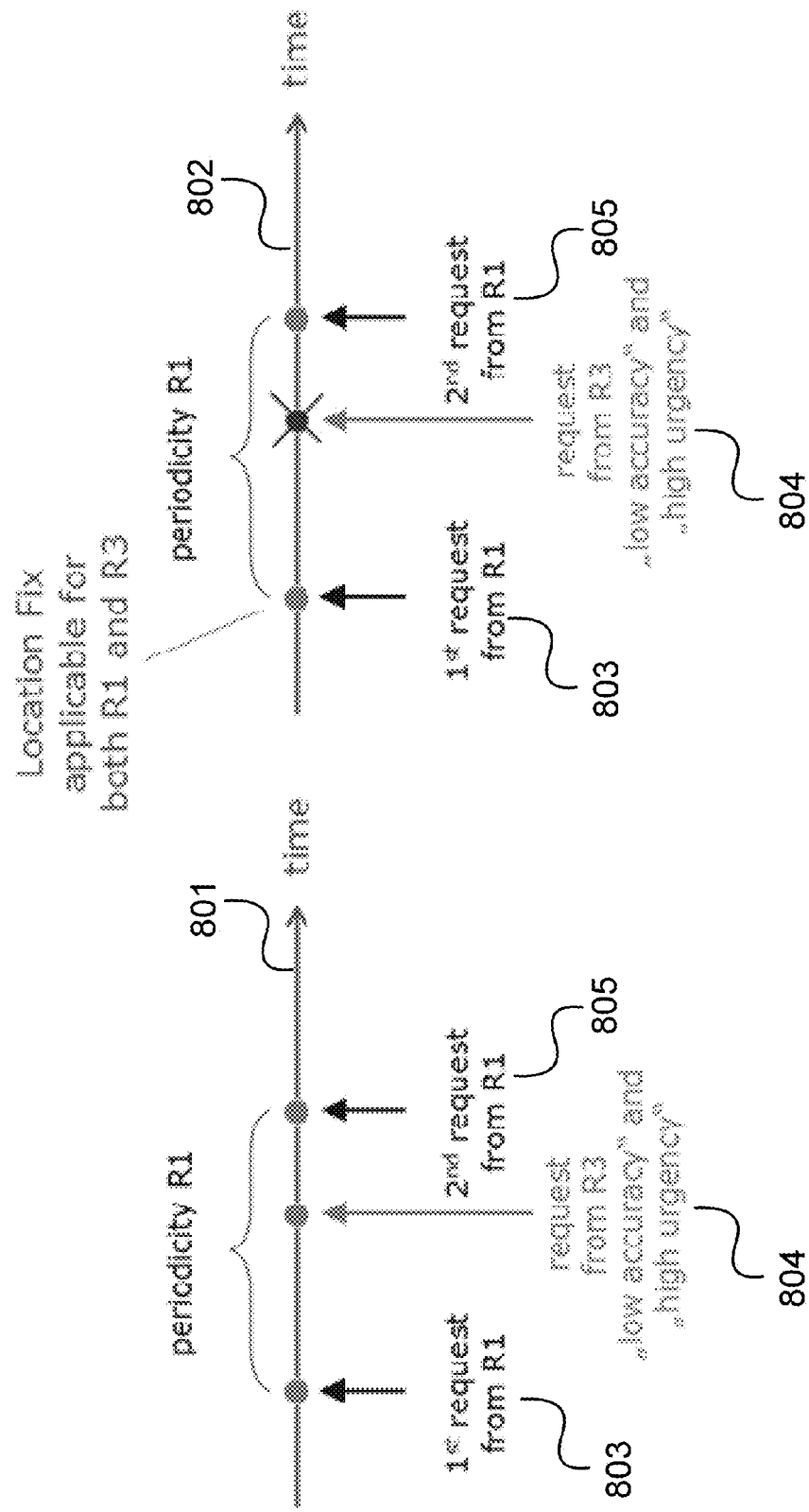

MOBILE COMMUNICATION DEVICE AND METHOD FOR PROVIDING POSITIONING INFORMATION

TECHNICAL FIELD

The present invention generally relates to mobile communication devices and methods for providing location (or positioning) information.

BACKGROUND

With the increasing number of mobile communication terminals (e.g. cell phones, PDAs, pagers, sensors, etc) being able to determine its own geographical location either via GPS modules and/or similar positioning techniques, modern communication terminals have a high degree of self awareness with respect to their current location. This allows for not only creation of new applications but also facilitation of certain functionality in the lower layers of the communication protocol stack.

The 3GPP (Third Generation Partnership Project) standards already started to make use of such location awareness capability by, for example, suggesting that a CSG (Closed Subscriber Group) cell (i.e., a femto cells or a cell operated by a Home Base Station) could be "fingerprinted" to its location, such that the user can quickly find the cell in the future.

Another item identified in the standards is MDT (Minimization of Drive Tests). This feature allows a mobile terminal to report to the network a set of measurements, including, optionally, its location (whenever available).

Further, location information of a mobile terminal may be used to optimize neighbor cell measurements and cell reselection procedures for UEs (User Equipemants) in RRC_IDLE state.

In summary, more and more functionality is currently being identified where location information can be of great help to a mobile terminal, not only from an application point of view, but in a more holistic manner. The additional functionality that may benefit from a mobile terminal's location awareness may reside, for instance, in the NAS (Non-Access Stratum), the RRC (Radio Resource Control) layer, or any other of the lower layers of the LTE (Long-Term Evolution) protocol stack.

SUMMARY

According to an aspect of this disclosure, a mobile communication device is provided including a positioning circuit configured to determine the geographical position of the mobile communication device; a requester configured to generate a request for information about the geographical position of the mobile communication device; a location management circuit configured to receive an indication of the determined geographical position of the mobile communication device from the positioning circuit, receive the request from the requester, process the request, and provide information about the geographical position of the mobile communication device to the requester based on the result of the processing of the request and the received indication of the geographical position of the mobile communication device.

According to another aspect of this disclosure, a method for providing positioning information according to the above mobile communication device is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of this disclosure of the invention are described with reference to the following drawings, in which:

FIG. 6 shows a message flow diagram.
FIGS. 8A and 8B show timelines illustrating a chronology of requests for information about the geographical position of a mobile communication device.

DESCRIPTION

The following detailed description refers to the accompanying drawings that show, by way of illustration, specific details and aspects of this disclosure in which the invention may be practiced.

The word "exemplary" is used herein to mean "serving as an example, instance, or illustration". Any aspect of this disclosure or design described herein as "exemplary" is not necessarily to be construed as preferred or advantageous over other aspects of this disclosure or designs.

A "circuit" may be understood as any kind of a logic implementing entity, which may be hardware, software, firmware, or any combination thereof. Thus, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code such as, e.g. Java. Any other kind of implementation of the respective functions which will be described in more detail below may also be understood as a "circuit".

The terms "coupling" or "connection" are intended to include a direct "coupling" or direct "connection" as well as an indirect "coupling" or indirect "connection" respectively.

The term "protocol" is intended to include any piece of software and/or hardware that is provided to implement part of any layer of the communication definition. "Protocol" may include the functionality of one or more of the following layers: physical layer (layer 1), data link layer (layer 2), network layer (layer 3), or any other sub-layer of the mentioned layers or any upper layer.

The communication protocol layers and its respective entities which will be described in the following may be implemented in hardware, in software, in firmware, or partially in hardware, and/or partially in software, and/or partially in firmware. One or more communication protocol layers and its respective entities may be implemented by one or more circuits. At least two communication protocol layers may be commonly implemented by one or more circuits.

Figure 1:
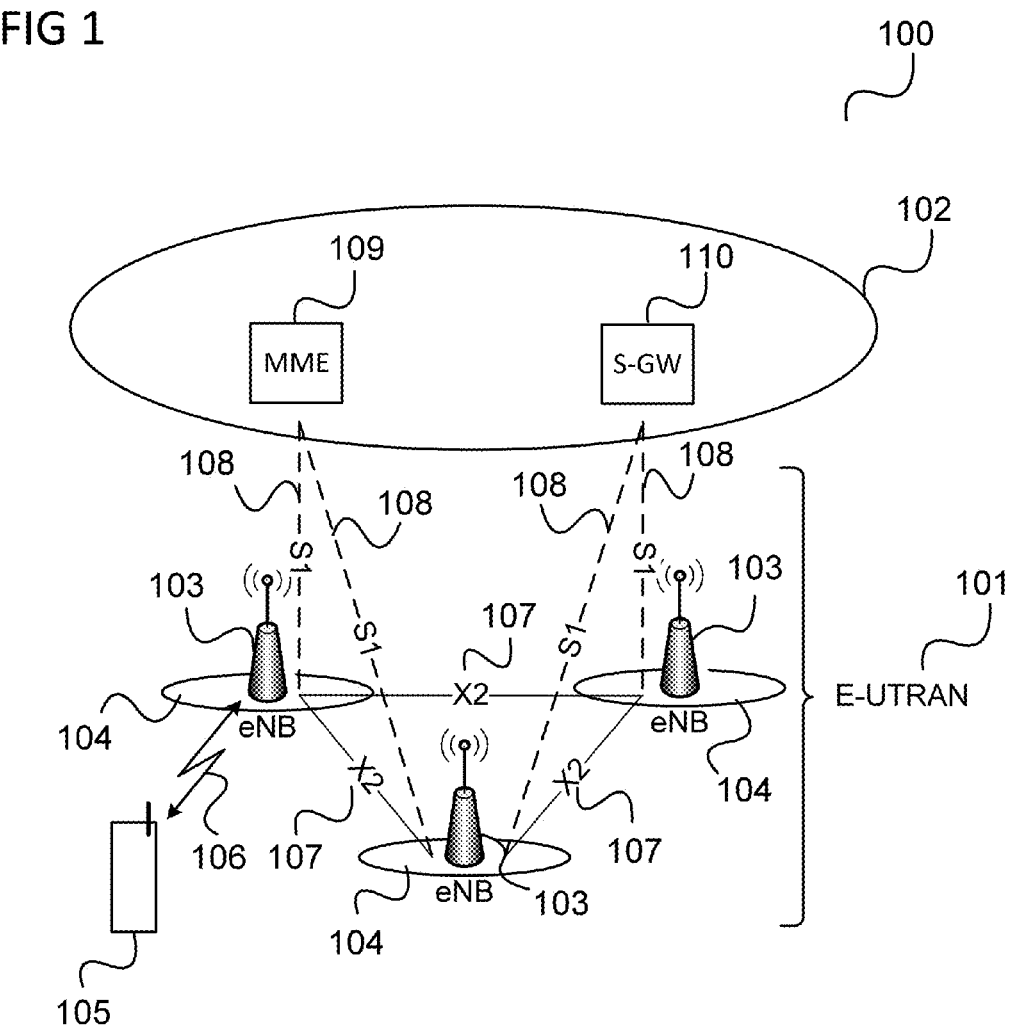
FIG. 1 shows a communication system.

FIG. 1 shows a communication system 100 according to an aspect of this disclosure.

The communication system 100 is a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution)) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment) 105 located in a mobile radio cell 104 may communicate with the core network 102 and with other mobile terminals 105 via the base station providing coverage in (in other words operating) the mobile radio cell. In other words, the base station 103 operating the mobile radio cell 104 in which the mobile terminal 105 is located provides the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109 via a S1-MME interface and to a Serving Gateway (S-GW) 110 by means of an S1-U interface. The S1 interface supports a many-to-many relation between MMEs/S-GWs 109, 110 and the base stations 103, i.e. a base station 103 can be connected to more than one MME/S-GW 109, 110 and an MME/S-GW can 109, 110 be connected to more than one base station 103. This enables network sharing in LTE.

For example, the MME 109 may be responsible for controlling the mobility of mobile terminals located in the coverage area of E-UTRAN, while the S-GW 110 is responsible for handling the transmission of user data between mobile terminals 105 and core network 102.

In case of LTE, the radio access network 101, i.e. the E-UTRAN 101 in case of LTE, can be seen to consist of the base station 103, i.e. the eNBs 103 in case of LTE, providing the E-UTRA user plane (PDCP/RLC/MAC) and control plane (RRC) protocol terminations towards the UE 105.

Figure 2:
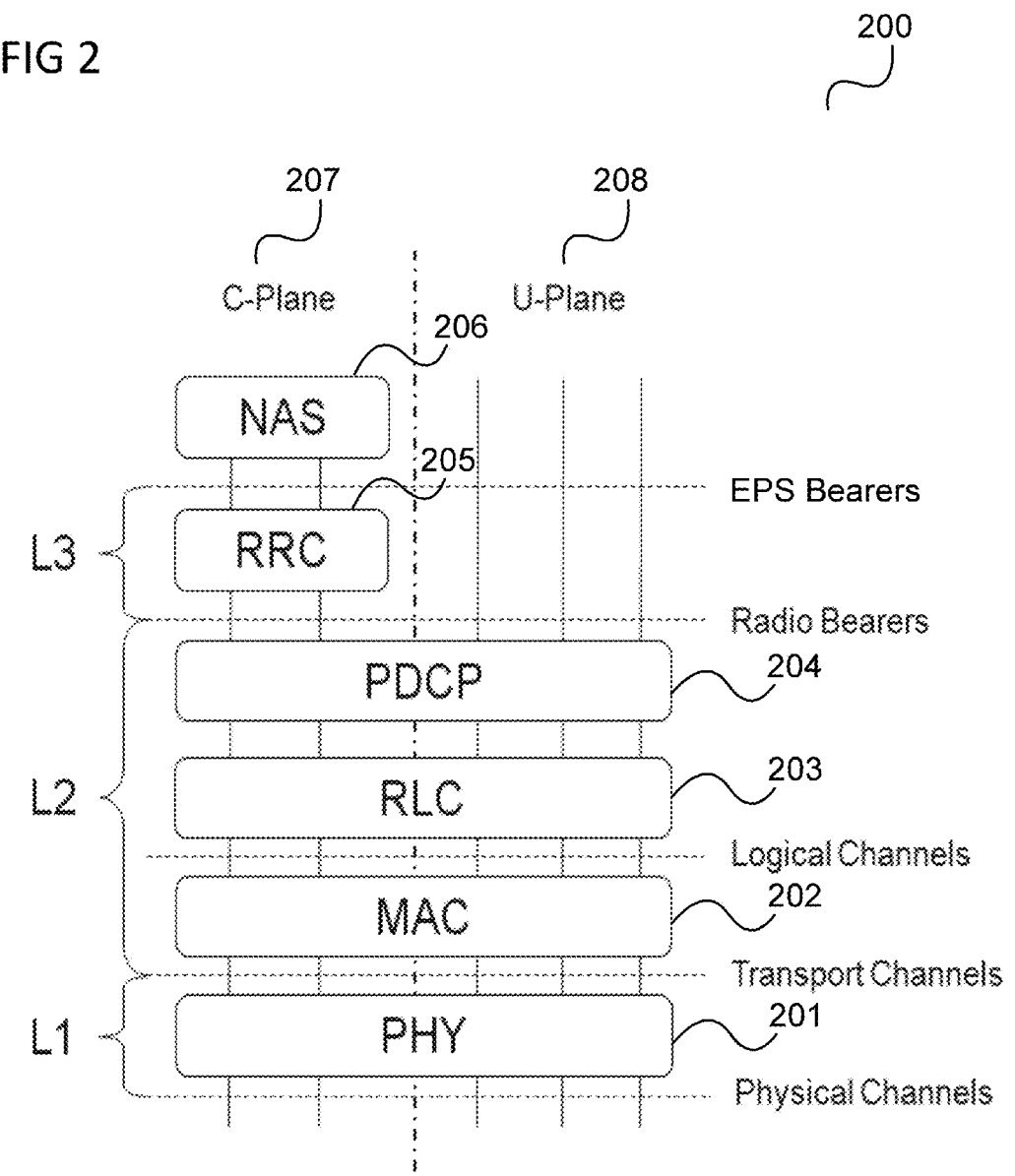
FIG. 2 shows a protocol structure.

The protocols for the C-Plane and the U-Plane of the E-UTRAN 101 according to LTE are illustrated in FIG. 2.

FIG. 2 shows a protocol structure 200 according to an aspect of this disclosure. The LTE air interface (also referred to as Uu interface) is logically divided into three protocol layers. The entities ensuring and providing the functionality of the respective protocol layers are implemented both in the mobile terminal 105 and the base station 103 or (in case of NAS, in the mobile terminal 105 and the MME 109). The bottommost layer is the physical layer (PHY) 201, which represents the protocol layer 1 (L1) according to the OSI (Open System Interconnection) reference model. The protocol layer arranged above PHY is the data link layer, which represents the protocol layer 2 (L2) according to the OSI reference model. In an LTE communication system, L2 consists of plurality of sublayers, namely the Medium Access Control (MAC) sublayer 202, the Radio Link Control (RLC) sublayer 203 and the Packet Data Convergence Protocol (PDCP) sublayer 204. The topmost layer of the Uu air interface is the network layer, which is the protocol layer 3 (L3) according to the OSI reference model and consists of the Radio Resource Control (RRC) layer 205 on the C-Plane 207. On the C-Plane 207, there is further the NAS (Non-Access Stratum) protocol layer 206.

Each protocol layer 201 to 206 provides the protocol layer above it with its services via defined service access points (SAPs). To provide a better understanding of the protocol layer architecture, the SAPs were assigned unambiguous names: The PHY 201 provides its services to the MAC layer 202 via transport channels, the MAC layer 202 provides its services to the RLC layer 203 via logical channels, and the RLC layer 203 provides its services to the RRC layer 205 and the PDCP layer 204 as data transfer as function of the RLC mode, i.e. TM (Transparent Mode), UM (Unacknowledged Mode) and AM (Acknowledged Mode). Further, the PDCP layer 204 provides its services to the RRC layer 205 and the U-Plane 208 upper layers via radio bearers, specifically as Signaling Radio Bearers (SRB) to the RRC 205 and as Data Radio Bearers (DRB) to the U-Plane 208 upper layers. According to LTE a maximum of 3 SRBs and 11 DRBs is currently supported.

The radio protocol architecture is not just split horizontally into the above-described protocol layers; it is also split vertically into the "control plane" (C-Plane) 207 and the "user plane" (U-Plane) 208. The entities of the control plane 207 are used to handle the exchange of signaling data between the mobile terminal 105 and the base station 103 or core network 109, which are required among other for the establishment, reconfiguration and release of physical channels, transport channels, logical channels, signaling radio bearers and data radio bearers, whereas the entities of the user plane 208 are used to handle the exchange of user data between the mobile terminal 105 and the base station 103.

The mobile terminal 105 may have a positioning circuit that determines the geographical position of the mobile terminal 105, for example a GPS module determining the geographical position of the mobile terminal 105 by means of GPS (Global Positioning System). The GPS module is one example for a logical and/or physical entity that is capable of determining the position of the mobile terminal 105. In the following, such an entity is also referred to as positioning circuit. The term positioninig circuit may also include modules that are capable of making a location fix (i.e., a position determination) for a mobile device based on other positioning techniques than GPS, such as triangularization (with or without network assistance), and methods based on observing the time difference of (at least two) signals arriving at the mobile device that were transmitted from (at least two) distinct sources. GPS is one positioning technique out of the class of GNSS (Global Navigation Satellite System) positioning methods. If GNSS positioning techniques are used, the calculated position usually consists of longitude, latitude, and altitude. Additionally, it may include the speed and the direction of the mobile device in question.

The possibility to determine its geographical position (and possibly additional information such as speed and heading) increases the mobile terminal's location awareness which may be used to for various functionalities.

A functionality that uses a mobile terminal's location awareness according to various aspects of this disclosure may reside for instance in the NAS, the RRC layer, or any other of the lower layers of the LTE. For example, a requester for geographical information may be an entity of any of these layers of a mobile communication device. A requester may also for example be a software application running on a mobile communication device.

A positioning circuit typically receives requests for a location fix and sends responses without coordination. Thus, it may happen that it receives two consecutive requests to perform location fixes from two distinct delay tolerant requesters (that do not know about each other) within a short period of time and calculates its position twice because it is not aware of the delay tolerant characteristic of the requesters.

According to one aspect of this disclosure, an entity is provided in a mobile communication terminal which, among others, manages the requests and the distribution of location information.

Figure 3:
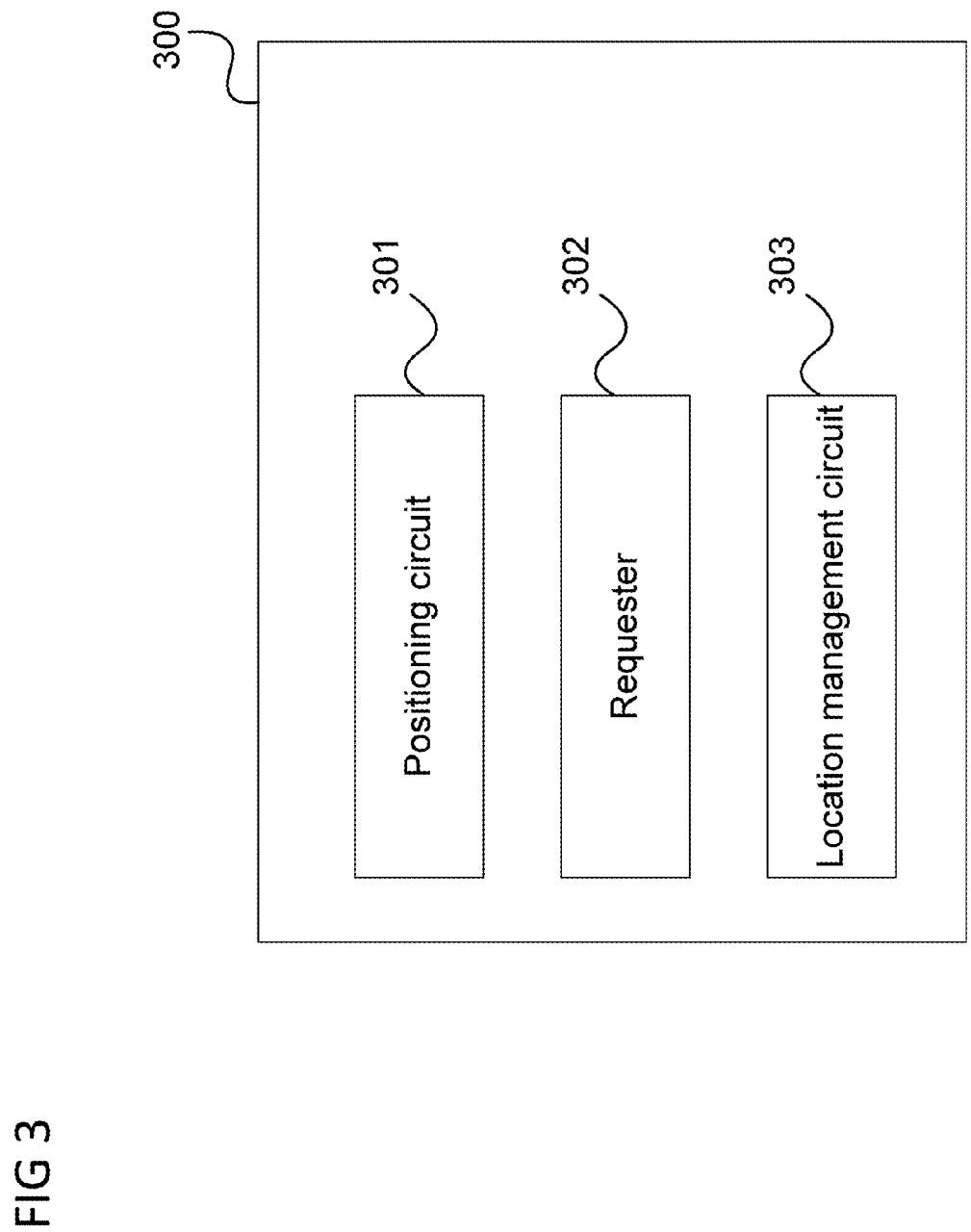
FIG. 3 shows a mobile communication device.

FIG. 3 shows a mobile communication device 300 according to an aspect of this disclosure.

The mobile communication device 300 includes a positioning circuit 301 configured to determine the geographical position of the mobile communication device.

The mobile communication device 300 further includes a requester 302 configured to generate a request for information about the geographical position of the mobile communication device.

Additionally, the mobile communication device 300 includes a location management circuit configured to receive an indication of the determined geographical position of the mobile communication device from the positioning circuit, receive the request from the requester, process the request and provide information about the geographical position of the mobile communication device to the requester based on the result of the processing of the request and based on the indication of the geographical position of the mobile communication device.

In other words, according to one aspect of this disclosure, an entity is provided in a mobile communication device that is arranged to communicate and exchange information with one or more requesters for geographical information and one or more modules determining geographical information.

This can be seen as centralized approach where this entity (referred to as location management entitiy) manages the various location requests received from different entities of the mobile communation device, compiles/processes the requests, forwards the resulted compilation to a positioining circuit (e.g. a GPS unit) and then distributes the responses from the positioning circuit accordingly. The location management unity (or location management circuit) may be seen to have a broker functionality with respect to the information about the geographical position of the mobile communication device and may be a logical unit and may be, for example, implemented as a part of a positioning circuit itself or could reside elsewhere in the mobile communication device. It may also be a separate module residing in the mobile communication device and interfacing with the positioning circuit and related requesters. A requester may, for example, be an application, an entity of the Operating System (OS), an entity of the NAS layer, an entity of the RRC layer, etc. A request by the requester may include certain parameters (e.g., a desired accuracy, and a maximum allowed delay). It may also specify that the requester would like to receive information about the geographical position of the mobile communication device on a regular basis (e.g., "I would be interested in receiving altitude with high accuracy every 30 seconds"). The location management circuit may also inform the requester about the availability of geographical position of the mobile communication device (e.g., "Position information becomes available with medium accuracy every 5 minutes").

The mobile communication device may, for example, be a communication terminal such as a cell phone, a tablet computer or a laptop computer. It may be configured to operate as a subscriber terminal according to one or more communication standards such as LTE (and thus operate as a UE as described above), GSM (Global System for Mobile Communications), UMTS (Universal Mobile Telecommunications System), WLAN (Wireless Local Area Network), CDMA2000 etc.

The processing may include determining whether the positioning circuit should be instructed to re-determine the geographical position or whether the information about the geographical position should be provided based on a stored indication of (or stored information about) the geographical position of the mobile communication device.

For example, the location management circuit is configured to instruct the positioning circuit to re-determine the geographical position if the location management circuit has decided, e.g. based on some internal procedure or algorithm, that the positioning circuit should be instructed to re-determine the geographical position, for example since it has decided that an updated geographical position is needed. In this case the positioning circuit may be configured to determine the geographical position of the mobile communication device (e.g. in response to the instruction by the location management circuit) and may send a response to the location management circuit. For example, if the internal procedure or algorithm of the location management circuit decides that an updated geographical position is not needed a stored geographical position which was determined in a previous transaction may be used. For this, the location management circuit may have to read previously calculated geographical position from a data base (e.g., memory), or may to instruct the positioning circuit to do so.

The location management circuit may further be configured to decide when to instruct the positioning circuit to re-determine the geographical position and to instruct the positioning circuit to re-determine the geographical position at a time according to the result of the decision.

The location management circuit may be configured to decide whether the positioning circuit should be instructed to re-determine the geographical position based on a time since the determination of the geographical position. For example, if it has been a long time since the last determination (on which the stored indication is based), it may be decided that the positioning circuit should be instructed to re-determine the geographical position while it may be decided that the positioning circuit should not be instructed to re-determine the geographical position if the time is short. The decision may be made based on comparing the time that has elapsed since the last position calculation with a given threshold. This threshold can be fixed and pre-configured in the device, or dynamically calculated, based, for example, on the velocity of the mobile communication device.

The location management circuit may also be configured to decide whether the positioning circuit should be instructed to re-determine the geographical position based on a desired accuracy of the information about the geographical position. For example, if a high accuracy is desired (or required), it may be decided that the positioning circuit should be instructed to re-determine the geographical position while it may be decided that the positioning circuit should not be instructed to re-determine the geographical position if only low accuracy is desired. For example, it may not be acceptable to use a stored indication for providing the information about the geographical position of the mobile communication device since the position of the mobile communication device may have changed and thus the accuracy of the indication is low.

The requester may be configured to include an indication of a desired accuracy of the information about the geographical position into the request.

The location management circuit may also be configured to decide whether the positioning circuit should be instructed to re-determine the geographical position based on an allowed delay of the provision of the information about the geographical position. For example, if only a short delay is allowed (or desired), it may be decided that the positioning circuit should be instructed to re-determine the geographical position while it may be decided that the positioning circuit should not be instructed to re-determine the geographical position if a long delay is allowed (or desired).

The requester may be configured to include an indication of an allowed delay of the provision of the information about the geographical position.

The location management circuit may be configured to decide whether the positioning circuit should be instructed to re-determine the geographical position based on a priority of the requester. For example, if the priority is high, it may be decided that the positioning circuit should be instructed to re-determine the geographical position while it may be decided that the positioning circuit should not be instructed to re-determine the geographical position if the requester's priority is low.

According to one aspect of this disclosure, the mobile communication device further includes another requester configured to generate another request for information about the geographical position of the mobile communication device and the location management circuit is configured to receive the other request from the other requester and to provide information about the geographical position of the mobile communication device to the other requester. The other request may for example be received by the location management circuit before the request, i.e. may be an earlier request than the request. The other request may also be received by the location management circuit after the request, i.e. may be a later request than the request.

It should be noted that the information requested by the other requester can be the same information as the information requested by the requester. For example, the request for the information and the other request for the information can both be requests for an indication of the current geographical position of the mobile communication device. The information about the geographical position of the mobile communication device requested by the other requester can also be information about the geographical position of the mobile communication device at another point in time than the information requested by the requester.

The location management circuit may be configured to instruct the positioning circuit to determine the geographical position of the mobile communication device in response to the other request and the positioning circuit may be configured to determine the geographical position of the mobile communication device in response to the instruction. For example, the determination carried out by the positioining circuit may have been carried out in response to an earlier other request. Accordingly, the indication of the geographical position may be based on the determination in response to an earlier other request (the information provided in response to the request may thus be obsolete to a certain level). As another example, the determination carried out by the positioining circuit may be carried out in response to a later other request. Accordingly, the indication of the geographical position may be based on the determination in response to a later other request (the response to the request may thus be delayed until the other request).

The processing may for example include deciding whether the information about the geographical position of the mobile communication device requested by the other requester and the information about the geographical position of the mobile communication device requested by the requester should both be based on the same determination of the geographical position of the mobile communication device or whether the information about the geographical position oft he mobile communication device requested by the other requester and the information about the geographical position of the mobile communication device requested by the requester should be based on different determinations of the geographical position of the mobile communication device.

The location management circuit may be configured to instruct the positioning circuit to determine the geographical position if the location management circuit has decided that the information about the geographical position of the mobile communication device requested by the other requester and the information about the geographical position of the mobile communication device requested by the requester should be based on different determinations of the geographical position of the mobile communication device and the positioning circuit may be configured to determine the geographical position of the mobile communication device in response to the instruction to determine the geographical position. In other words, the determination of the geographical position may be carried out in response to the request, for example when it has been decided that the information about the geographical position provided in response to the request should not be based on a further determination carried out in response to an earlier or later other request since this would lead to a low accuracy or a large delay, respectively.

The location management circuit may for example be configured to provide both the information about the geographical position of the mobile communication device requested by the other requester and the information about the geographical position of the mobile communication device requested by the requester based on the indication of the geographical position of the mobile communication device if it has been decided that the information about the geographical position of the mobile communication device requested by the other requester and the information about the geographical position of the mobile communication device requested by the requester should both be based on the same determination of the geographical position of the mobile communication device.

The location management circuit may be configured to decide whether the information about the geographical position of the mobile communication device requested by the other requester and the information about the geographical position of the mobile communication device requested by the requester should both be based on the same determination of the geographical position of the mobile communication device or whether the information about the geographical position of the mobile communication device requested by the other requester and the information about the geographical position of the mobile communication device requested by the requester should be based on different determinations of the geographical position of the mobile communication device based on a difference between the requested time of provision of the information requested by the other requester and the requested time of provision of the information requested by the requester. For example, it may be decided that the information about the geographical position of the mobile communication device requested by the other requester and the information about the geographical position of the mobile communication device requested by the requester should both be based on the same determination of the geographical position of the mobile communication device in case that the difference between the requested time of provision of the information requested by the other requester and the requested time of provision of the information requested by the requester is short. On the other hand, it may be decided that the information about the geographical position of the mobile communication device requested by the other requester and the information about the geographical position of the mobile communication device requested by the requester should be based on different determinations of the geographical position of the mobile communication device if the difference between the requested time of provision of the information requested by the other requester and the requested time of provision of the information requested by the requester is high. The requester may for example be configured to include a time of provision of the information into the request. The request may also indicate (possibly implicitly) that the information is requested for the time of the transmission of the request (or instantly thereafter).

The location management circuit may be configured to decide whether the information about the geographical position of the mobile communication device requested by the other requester and the information about the geographical position of the mobile communication device requested by the requester should both be based on the same determination of the geographical position of the mobile communication device or whether the information about the geographical position of the mobile communication device requested by the other requester and the information about the geographical position of the mobile communication device requested by the requester should be based on different determinations of the geographical position of the mobile communication device based on a desired accuracy of the information about the geographical position. For example, it may be decided that the information about the geographical position of the mobile communication device requested by the other requester and the information about the geographical position of the mobile communication device requested by the requester should both be based on the same determination of the geographical position of the mobile communication device in case that the desired accuracy is low (i.e. a low accuracy is sufficient). On the other hand, it may be decided that the information about the geographical position of the mobile communication device requested by the other requester and the information about the geographical position of the mobile communication device requested by the requester should be based on different determinations of the geographical position of the mobile communication device in case that the desired accuracy is high.

In this context, the requester may be configured to include an indication of a desired accuracy of the information about the geographical position into the request.

The location management circuit may also be configured to decide whether the information about the geographical position of the mobile communication device requested by the other requester and the information about the geographical position of the mobile communication device requested by the requester should both be based on the same determination of the geographical position of the mobile communication device or whether the information about the geographical position of the mobile communication device requested by the other requester and the information about the geographical position of the mobile communication device requested by the requester should be based on different determinations of the geographical position of the mobile communication device based on an allowed delay of the provision of the information about the geographical position. For example, it may be decided that the information about the geographical position of the mobile communication device requested by the other requester and the information about the geographical position of the mobile communication device requested by the requester should both be based on the same determination of the geographical position of the mobile communication device in case that the allowed delay is high (e.g. higher than an expected time until the provision of the information requested by the other requester). On the other hand, it may be decided that the information about the geographical position of the mobile communication device requested by the other requester and the information about the geographical position of the mobile communication device requested by the requester should be based on different determinations of the geographical position of the mobile communication device if the in case the allowed delay is low (e.g. lower than an expected time until the provision of the information requested by the other requester).

In this context, the requester may be configured to include an indication of an allowed delay of the provision of the information about the geographical position.

The positioning circuit may be configured to re-determine the geographical position and the location management circuit may be configured to store the indication of the determined geographical position, receive an indication of the re-determined geographical position, update the stored indication of the determined geographical position based on the indication of the re-determined geographical position. For example, the positioning circuit may be configured to re-determine the geographical position and provide to the information to the location management circuit at every time a position is re-calculated. The location management circuit may be configured to store the information received from the positioning circuit regarding the geographical position.

According to one aspect of this disclosure, the requester is configured to include an indication of a desired accuracy of the information about the geographical position into the request, the processing includes determining the desired accuracy from the request, the location management circuit is configured to instruct the positioning circuit to determine the geographical position with the determined desired accuracy and the positioning circuit is configured to determine the geographical position with the desired accuracy in response to the instruction.

According to one aspect of this disclosure, the mobile communication device may include a plurality of positioning circuits and the location management circuit may be configured to select the a positioning circuit of the plurality of positioning circuits that should determine the geographical position in response to the request and to instruct the selected positioning circuit to determine the geographical position and the positioning circuit is configured to determine the geographical position in response to the instruction.

According to one aspect of this disclosure, the mobile communication device includes a plurality of positioning circuits, wherein the location management circuit is configured to provide a common interface for the requester to request information about the geographical position of the mobile communication device from the positioning circuits.

The processing of the request may include converting the request from a format according to the common interface to a format required by the positioning circuit and vice-versa.

The request may indicate that information about the geographical position should be provided to the requester on a regular basis and the location management circuit is configured to provide information about the geographical position on a regular basis in response to the request.

Figure 4:
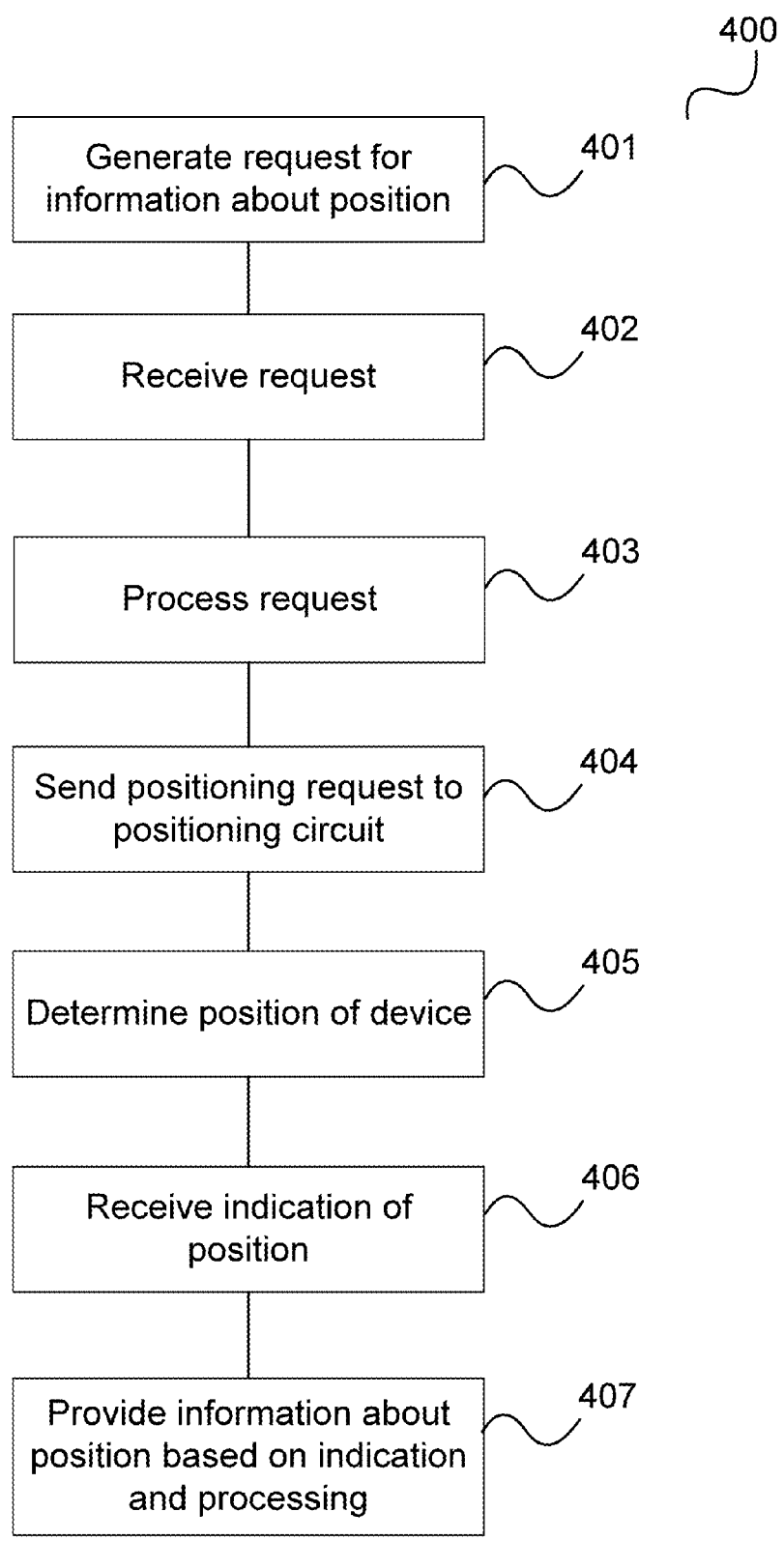
FIG. 4 shows a flow diagram.

The mobile communication device 300 for example carries out a method as illustrated in FIG. 4.

FIG. 4 shows a flow diagram 400 according to an aspect of this disclosure.

In 401 a requester of the mobile communication device generates a request for information about the geographical position of the mobile communication device. In 402 the location management circuit receives the request from the requester. In 403 the location management circuit processes the request which may for example include deciding if a new location fix is needed. In one embodiment, the decision in 403 whether a new location fix is needed (required/justified) or not is based on the battery's status indication (i.e. the location management circuit may take the battery's status indication into account among other criteria). If yes (i.e. if a new location fix is needed), the location management circuit may in 404 send a request to the positioning circuit and in 405 the positioning circuit determines the geographical position of the mobile communication device and in 406 the positioning circuit delivers the fix to the location management circuit, e.g. in the form of an indication of the geographical position of the mobile communication device. In 407, the location management circuit provides information about the geographical position of the mobile communication device to the requester based on the result of the processing of the request and based on the indication of the geographical position of the mobile communication device. It should be noted that the steps do not need to be carried out in the order shown in FIG. 4, but other orders are possible. For example, the determination of the geographical position may be carried out by the positioning circuit even without a request from the location management circuit. In this case the result may or may not be provided to the location management circuit. Further, the processing does not necessarily need to include deciding whether a new location fix is needed and sending a request to the positioning circuit if it is needed. Further, if the location management circuit decides, e.g. based on some internal procedure or algorithm, that a new location fix is not needed, the location management circuit may read a previously calculated geographical position from a data base (e.g., memory), or may to instruct the positioning circuit to do so.

It should further be noted that aspects described in context of the mobile communication device are analogously valid for the method for providing positioning information and vice versa.

Possible exemplary functionalities of a location management entity (or location management circuit) provided in a mobile communication device are described in the following with reference to FIG. 5.

Figure 5:
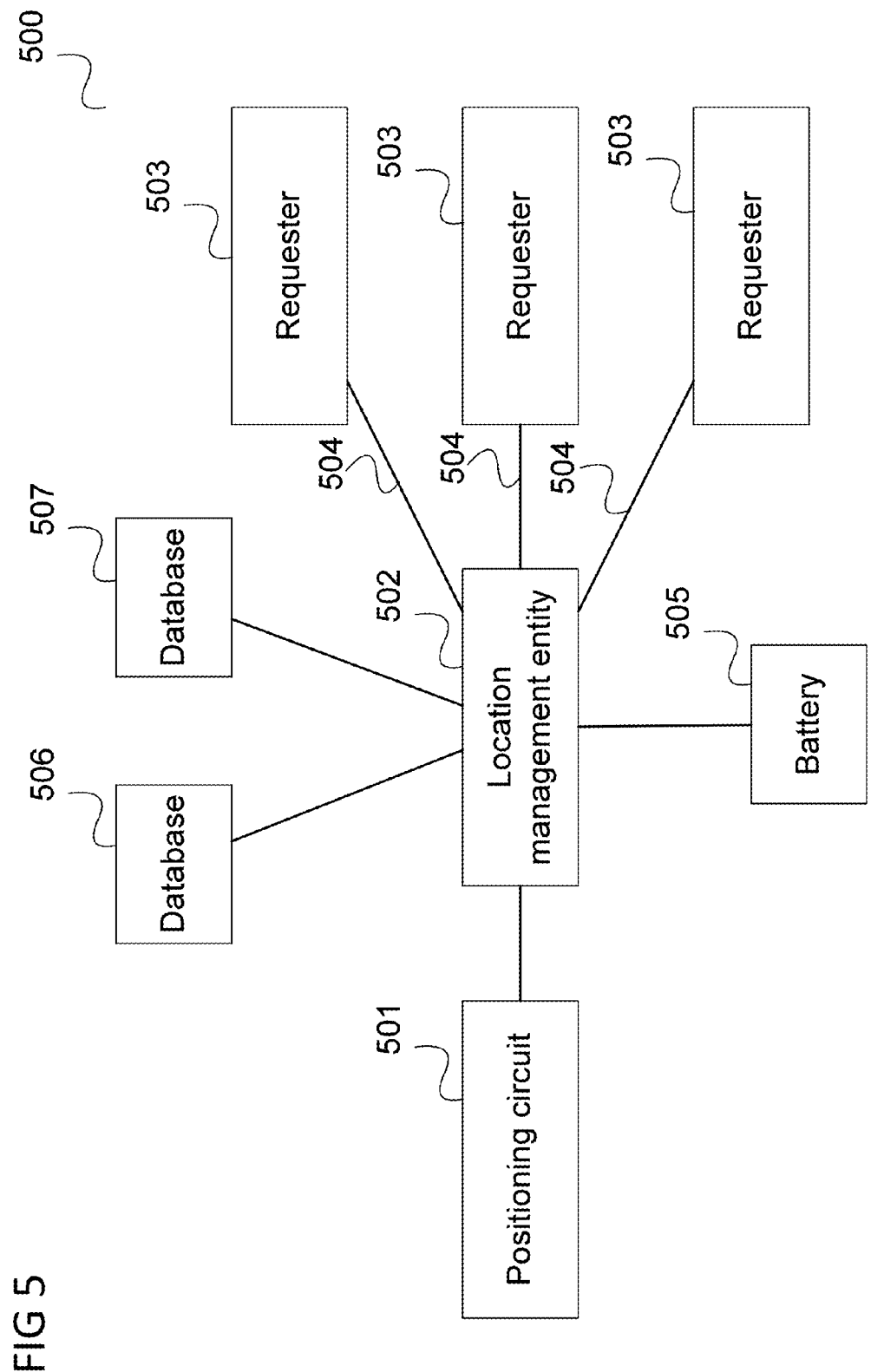
FIG. 5 shows a mobile communication device.

FIG. 5 shows a mobile communication device 500 according to an aspect of this disclosure.

The mobile communication device 500 includes a positioning circuit, in this example a GPS module 501, a location management entity 502 and, in this example, a plurality of requesters 503, wherein each requester 503 is coupled with the location management entity 502 via a respective interface 504.

The mobile communication device 500 may further include a battery 505 which supplies status information (e.g. its charge level) to the location management entity 502. In one example of the present invention the battery's status indication is considered by the location management entity 502, i.e. the battery's status indication is used as an input to the determination procedure (e.g., comprising an internal procedure or an algorithm, as discussed above).

The location management entity 502 may be connected to (or may inherently include) a first data base 506 (e.g. implemented by a memory of the mobile communication device 500) in which one or more previous location fixes (e.g. one or more indications of a previously determined geographical position of the mobile communication device 500) may be stored. The first data base 506 may be used for the re-use of previous location fixes, i.e. for responding to a request by one of the requesters 503 based on a previously determined geographical position instead of a re-determination of the geographical position of the mobile communication device. For this, stored previous location fixes may each be tagged with a time stamp (and entries, i.e. location fixes, which have become to old may be discarded) and/or to classify them, for instance based on their level of accuracy.

The location management entity 502 may also be connected to (or may inherently include) a second data base 507 (e.g. implemented by a memory of the mobile communication device 500) in which rules for handling one or more requests from the requesters 503 may be stored. The second data base 507 may for example be used when conflicting requests for location fixes are received from various requesters 503. The second data base 503 may also be used to store information about ongoing GPS module query schedules (e.g. information about what requesters are known already to the location management entity 502, what requesters are currently active/dormant, whether the requesters use their normal/known query pattern/periodicity or is where there is any deviation etc.) and alike.

FIG. 6 shows a message flow diagram 600 according to an aspect of this disclosure.

The message flow takes place between a positioning circuit 601, for example corresponding to the GPS module 501, a location management entity 602, for example corresponding to the location management entity 502 and a requester 603, for example corresponding to one of the requesters 503, which are all included in a mobile communication device.

In 604, the requester 603 generates a first request 605 for information about the geographical position of the mobile communication device.

In 606, the requester 603 sends the first request 605 to the location management entity 602.

In 607, the location management entity 602 processes the first request 605.

Depending on the result of the processing, the location management entity 602 may, in 608, send a second request 609 to determine the geographical position of the mobile communication device, e.g. a request for an indication of the geographical position of the mobile communication device (e.g. in terms of latitude, longitude and possibly altitude) to the positioning circuit 601. The second request 609 requests the positioning circuit 601 to determine the current geographical position of the mobile communication device.

In 610, the positioning circuit 601, in response to the second request 609, sends an indication 610 of the geographical position of the mobile communication device to the location management entity 602.

In 612, the location management entity 602 sends a response to the requester 603 which is based on the indication 611.

It should be noted that as result of the processing in 607, the location management entity 602 may decide not to send a request for an indication of the geographical position of the mobile communication device to the positioning circuit 601, i.e., it does not sent the second request 609, but instead it uses a stored indication of the geographical position previously provided by the positioning circuit 601 to respond to the request 605. The location management circuit 602 may also decide to delay the transmission of the second request 609 to the positioning circuit 601 (and thus delay the determination of the geographical position of the mobile communication device by the positioning circuit 601), for example until another one of the requesters 503 also has requested information about the geographical position of the mobile communication device. In other words, multiple requests received by the location management entity 502 from different requesters 503 can be combined into a single request going to the positioning circuit 501.

Examples for the delay of the determination of the geographical position of the mobile communication device and the responding to a request based on a previously determined geographical position of the mobile communication device are described in the following with reference to FIGS. 7A, 7B, 8A and 8B.

Figure 7B:
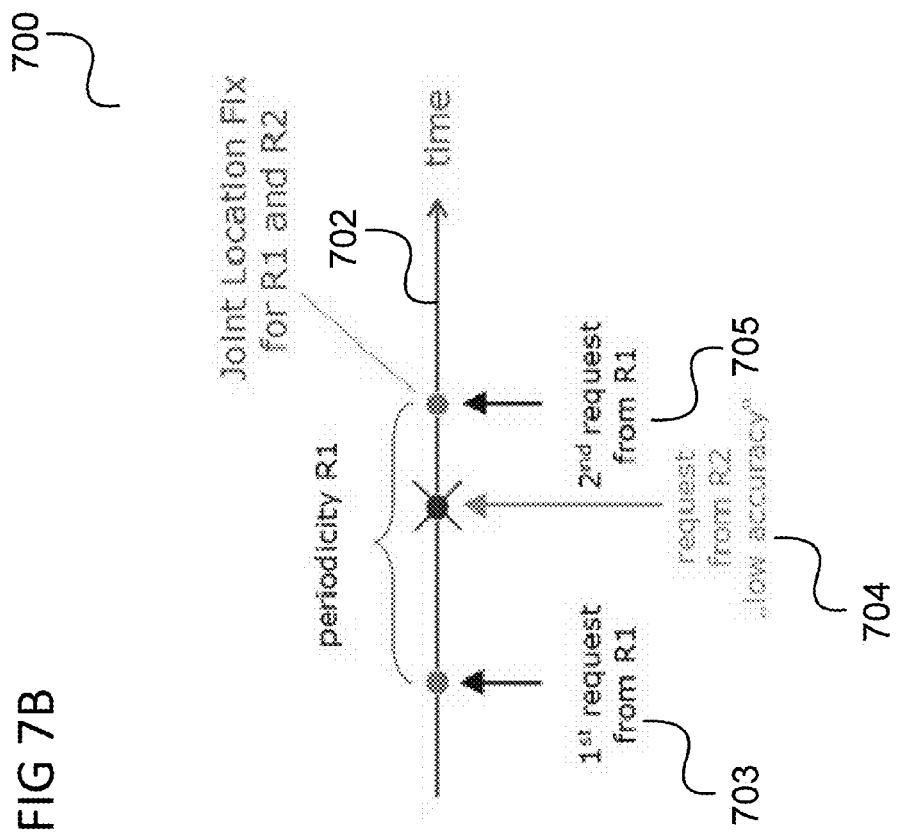
FIGS. 7A and 7B show timelines illustrating a chronology of requests for information about the geographical position of a mobile communication device.
Figure 7A:
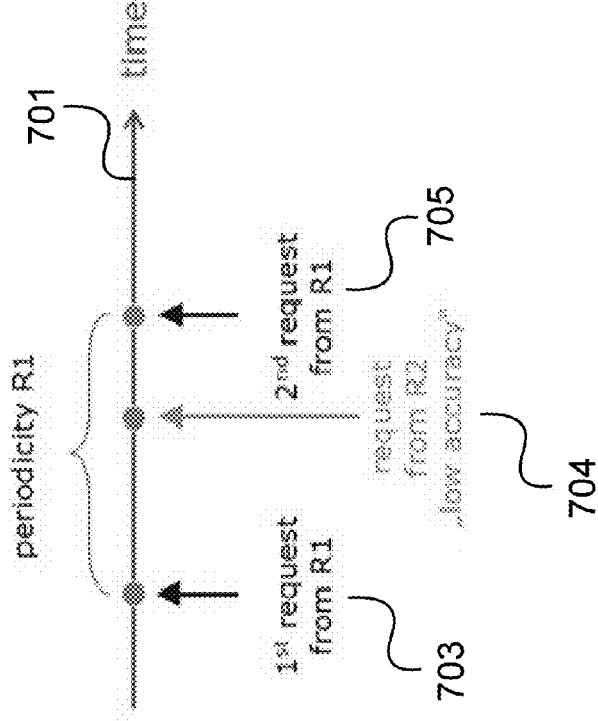

FIGS. 7A and 7B show timelines 701, 702 illustrating a chronology of requests for information about the geographical position of a mobile communication device.

In the timelines 701, 702, time increases from left to right.

FIGS. 7A and 7B illustrate the case that there are a two consecutive requests 703, 705 for information about the geographical position of a mobile communication device from one requester R1 and another request 704 from requester R2. The request from R2 704 is delay tolerant, i.e., can tolerate a delay of a response to its request.

The positioning circuit 501 could now be requested to calculate the position of the mobile communication device in response to each of the requests 703, 704, 705. However, according to one aspect of this disclosure, the location management entity makes use of the fact that the second requester is delay tolerant. Specifically, it is assumed that the first requester R1 has high accuracy requirements and periodically needs information about the geographical position of the mobile communication device while the second requester R2 sporadically needs information about the geographical position of the mobile communication device and has low accuracy requirements.

Accordingly, as illustrated in FIG. 7B, the location management entity 502 does not request the positioning circuit 501 to determine the geographical position of the mobile communication device in response to the request from R2 704, but rather responds to the request from R2 704 and the request from R1 705 jointly on only one determination of the geographical position of the mobile communication device requested from the positioning circuit 501. This can be seen as a coordination of the requests 704, 705, i.e. the coordination by the location management entity of requests by different requesters.

Another example is illustrated in FIGS. 8A and 8B.

FIGS. 8A and 8B show timelines 801, 802 illustrating a chronology of requests for information about the geographical position of a mobile communication device.

Time increases from left to right.

Similarly to FIGS. 7A and 7B, a first request 803 from a first requester is followed by a second request 804 by a second requester R3 and then a third request 805 again from the first requester.

In this example, it is assumed that second requester R3 has an infrequent and sporadic need for information about the geographical position of the mobile communication device, but that, when it requires, it requires it very urgently (i.e. it cannot wait).

Instead of requesting the positioning circuit 501 to calculate the position of the mobile communication device in response to each of the requests 803, 804, 805 as illustrated in FIG. 8A, which can be seen as responding to the requests 803, 804, 805 without coordination, the location management entity, according to one aspect of this disclosure, uses, as illustrated in FIG. 8B, the location fix calculated in response to the first request 803 also for responding to the second request 804. Thus, the number of determinations of the geographical position of the mobile communication device is, similarly to the example described with reference to FIGS. 7A and 7B, reduced by what can be seen as a coordination of the requests 803, 804, 805. Here, an interaction between the location management entity and the first data base 506 may be needed (as described above) in order to retrieve a previously calculated geographical position of the mobile communication device.

According to various aspects of this disclosure, the location management entity allows/provides one or more of the following:

1. The number of location fixes done by the positioning circuit 501 can be reduced due to coordination that can be provided by the location management entity 502.
2. Processing power and energy can be saved due to less location fixes and less messages exchanged in the system.
3. Various requesters 503 that may be dispersed throughout the entire system (from application layer, such as navigation software, through the Operating System (OS), down to protocol stack functionality, such as triggering CSG Proximity Indication) may be served.
4. A framework and an interface can be defined and provided so that any requester 503 can communicate directly with the location management unit 502, regardless of the localization method being used.
5. Functionality that conventionally does not use location information can take advantage of location information when such information is available without requiring extra battery consumption or processing power.
6. Information about the geographical position of the mobile communication device can be provided at different accuracy for different requesters 503. This allows for requesters to "sign-up" to a certain periodicity or certain accuracy at the location management entity 502, and the requests can be coordinated by the location management entity 502, thus reducing the number of request to determine the geographical position of the mobile communication device to the positioning circuit 501.
7. In case that multiple localization systems (i.e. positioning circuits) 501 are available in the mobile communication device (which are not necessarily limited to using GNSS technologies), the location management unit 502 can choose which localization system to use depending on the accuracy requirements of the requester 503 and power utilization of the localization systems 501.
8. In case that multiple localization systems 501 are available in the mobile communication device, the location management unit 502 can choose more than one localization system 502 for determining the geographical position of the mobile communication device to increase accuracy based on the requirements of the requester and power utilization of the localization systems 501.

The location management entity may for example have one or more of the following main responsibilities/functionalities:

1. Coordinating incoming location information requests from the requesters 503.
2. Updating location information (by interaction with the positioning circuit 501).
3. Managing/Grouping location information (i.e. information about the geographical position of the mobile communication device).
4. Providing location information responses tailored to the individual needs of the requesters 503.

5. Providing a framework or interface between the requesters 503 and the localization system, thus for example facilitating product evolution.
6. Selection of the best localization system 501 (in case of more than one localization system 501) to be used, for example depending on accuracy requirements and power limitations.

In the following, exemplary functionalities of the location management entity 502 are described.

Request Combination

The requests received from different requesters 503 can be combined into a single request. For example, if a first requester 503 needs a location fix every 5 minutes and a second requester 503 needs a location fix every 10 minutes, the location management entity 502 may combine these to a single position determining request to the positioning circuit 501 at every 5 minutes. Thus, instead of the positioning circuit 501 getting three requests in 10 minutes, the positioning circuit 501 would get only two requests in 10 minutes.

Pushing Information

A requester 503 may register with the location management entity (or location management function) 502 to receive location information every time it is (or becomes) available. There may be accuracy restrictions, such as providing the location information only if the location has change since the last time of providing the location information to the requester 503 by a given threshold.

Accuracy Negotiation

The location management entity 502 and the requester 503 can negotiate a given quality of service in terms of accuracy. For example, if a requester 503 needs a location fix every 5 minutes but there is a certain range of uncertainty allowed, the location management entity 502 which may be aware of the velocity of the mobile communication device, may adapt the frequency of position determination requests sent to the positioning circuit 501 depending on the velocity. For example, it may send more requests in case of higher velocity and fewer requests for lower velocity. In the extreme case of a stationary mobile communication device, the location management entity 502 for example only sends one single request to the positioning circuit 501 and then provides the same location fix to the requestor every 5 minutes without sending any new position determination requests to the positioning circuit 501, as long as the velocity remains zero.

Power Optimization/Negotiation

Quality of service negotiation between the location management entity 502 and a requester 503 does not have to be limited to accuracy. It may also be in terms of limiting the number of position determination requests generated by the location management unit 502 and sent to the positioning circuit 501. In order not to send to many requests to the positioning circuit 501 and optimize battery consumption, there may be some negotiation that, for example, if the total number of requests from that requester 503 exceeds a threshold then no new position determination requests are generated for that requester 503. This does not have to be limited to the requests coming from this requester 503. There may be a rule for a requester 503 that if all position determination requests generated by the location management unit 502 exceed a threshold then no new requests are generated on behalf of this requester 503. The location management entity 502 may also take into account status information from the battery 505, e.g. information about its charging level, to decide whether a position determination request is issued to the positioning circuit 501 for handling a request (e.g. in case that the charging level is high) or whether the request is rather handled based on previously determined, stored positioning information without issuing a request for (re-)determining the geographical position of the mobile communication device (e.g. in case that the charging level is low).

Prioritization

The location management unit 502 may only allow a maximum number of requests and if that maximum is reached it prioritizes requests of specific requesters. A prioritization rule may be as simple as that a position determination request is not generated for a given requester 503 which has low priority or it could be a more complex rule where some weighted average is used to reduce the overall number of requests from all requesters 503 to meet the maximum allowed threshold.

Registration and Authentication Capability

There might be certain occasions where the UE manufacturer might want to limit the access of the location information only to certain applications. The location management unit could provide registration and authentication to different requesters. That would allow some control from the manufacturer and also possibly from the network operator to limit which applications have access to GPS information. As an example, if the user wants to download a new application into her IPhone, this application would need to register and authenticate itself with the location management unit before accessing any GPS information.

Embrace Output of Multiple Location Modules

The mobile communication device may include a plurality of positioning circuits (or location determination modules) 501 and every positioning circuit 501 may have slightly different capabilities and requirements. For example, a location determination module may be provided for each of one or more of the following location determination techniques

GPS

The United States' Global Positioning System (GPS) consists of up to 32 medium Earth orbit satellites in six different orbital planes, with the exact number of satellites varying as older satellites are retired and replaced. Operational since 1978 and globally available since 1994, GPS is currently the world's most utilized satellite navigation system.

GLONASS

The formerly Soviet, and now Russian, Global'naya Navigatsionnaya Sputnikovaya Sistema (Global Navigation Satellite System), or GLONASS, was a fully functional navigation constellation in 1995. After the collapse of the Soviet Union, it fell into disrepair, leading to gaps in coverage and only partial availability. It was recovered and restored in 2011.

Compass

China has indicated they intend to expand their regional navigation system, called Beidou or Big Dipper, into a global navigation system by 2020 a program that has been called Compass in China's official news agency Xinhua. The Compass system is proposed to utilize 30 medium Earth orbit satellites and five geostationary satellites. A 12-satellite regional version (covering Asia and Pacific area) is expected to be completed by 2012.

Galileo

The European Union and European Space Agency agreed in March 2002 to introduce their own alternative to GPS, called the Galileo positioning system. At an estimated cost of EUR 3.0 billion the system of 30 MEO satellites was originally scheduled to be operational in 2010. The estimated year to become operational is 2014. The first experimental satellite was launched on 28 Dec. 2005. Galileo is expected to be compatible with the modernized GPS system. The receivers will be able to combine the signals from both Galileo and GPS satellites to greatly increase the accuracy. Galileo is now not expected to be in full service until 2020 at the earliest and at a substantially higher cost.

NBP
 Network based Positioning Techniques in the RAN (e.g., based on triangulation and time difference of arrival).

The location management entity 502 may for example take care of the following:
 Choose the right (i.e. matching to a particular incoming request) location module for handling a request for information about the geographical position of the mobile communication device;
 Trigger more than one location module to do a location fix;
 Combine the results received from various location modules intelligently in order to improve the overall system accuracy.

Framework

According to one aspect of this disclosure, a framework and an interface is defined so that any requester 503 can communicate directly with the location management unit 502 regardless of the localization method being used for handling requests from the requester 503. The requester 503 can be unaware of the type of localization method being used allowing for easier evolution into new localization systems in the future. As long as the interface between the location management entity 502 and the requesters 503 is properly defined, the determination of the location information itself can be transparent to the requester 503. Changes in the localization method do therefore not require changes in all requesters 503 that are using the location information. Only the location management entity 502 may need to be adapted to future changes Moreover, with this approach, if multiple localization systems 501 are available in the mobile communication device, the location management entity 502 can choose the best/most appropriate system to use, depending on the accuracy requirements of the requester and power utilization of the localization system. This can be done requester based (i.e. different requesters would be served using different localization services) or overall for all of the requesters 503 in the mobile communication device.

Figure 9:
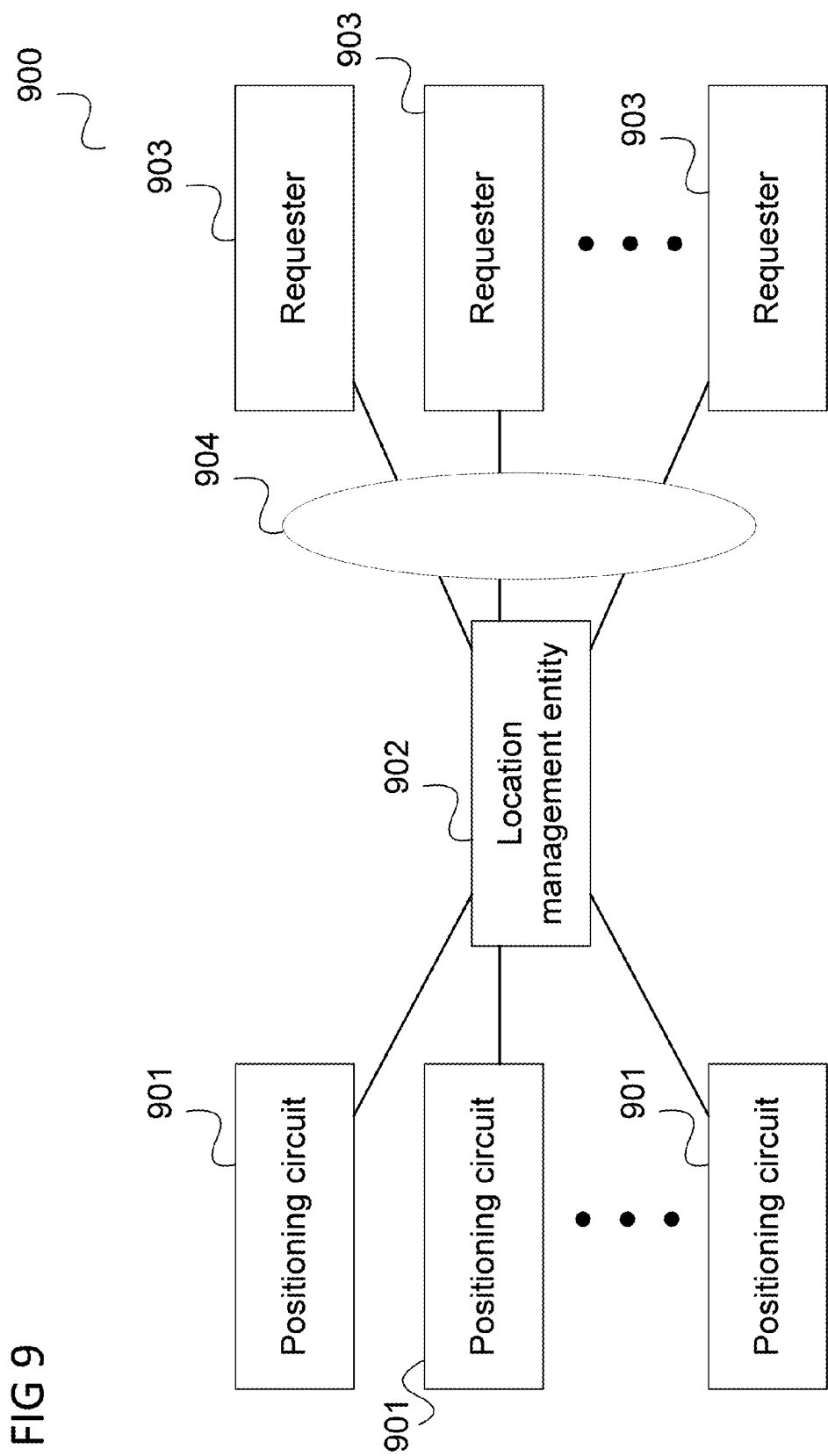
FIG. 9 shows a mobile communication device.

The provision of a framework (or interface) for the requesters 503 is illustrated in FIG. 9.

FIG. 9 shows a mobile communication device 900 according to an aspect of this disclosure.

The mobile communication device 900 includes a plurality of positioning circuits (also referred to as localization systems) 901, a location management entity 902 and a plurality of requesters 903. The requesters 903 are coupled via a framework 904 to the location management entity 902 which may form a common interface for the requesters 903 to access the location management entity 902 and thus the localization systems 901. For example, the requesters 903 may use the same request syntax (e.g. the same request message format) for requesting information about the geographical position of the mobile communication device independent from which localization system 901 provides the information. In this case, the location management entity 902 may be seen to encapsulate the localization systems 901 and may for example perform a protocol conversion between the format of the requests according to the framework 904 and the respective request format required by a respective localization system 901.

While the invention has been particularly shown and described with reference to specific aspects of this disclosure, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile communication device comprising:
 a positioning circuit configured to determine the geographical position of the mobile communication device;
 a requester configured to generate a request for information about the geographical position of the mobile communication device;
 a location management circuit configured to
 receive an indication of the determined geographical position of the mobile communication device from the positioning circuit;
 receive the request from the requester,
 process the request,
 provide information about the geographical position of the mobile communication device to the requester based on the result of the processing of the request and the indication of the geographical position of the mobile communication device,
 another requester configured to generate another request for information about the geographical position of the mobile communication device wherein the location management circuit is configured to receive the other request from the other requester and to provide information about the geographical position of the mobile communication device to the other requester,
 wherein processing the request comprises deciding whether the information about the geographical position of the mobile communication device requested by the other requester and the information about the geographical position of the mobile communication device requested by the requester should both be based on the same determination of the geographical position of the mobile communication device or whether the information about the geographical position of the mobile communication device requested by the other requester and the information about the geographical position of the mobile communication device requested by the requester should be based on different determinations of the geographical position of the mobile communication device.

2. The mobile communication device according to claim 1, wherein the processing includes determining whether the positioning circuit should be instructed to re-determine the geographical position or whether the information about the geographical position should be provided based on a stored indication of the geographical position of the mobile communication device.

3. The mobile communication device according to claim 2, wherein the location management circuit is configured to instruct the positioning circuit to re-determine the geographical position if the location management circuit has decided that the positioning circuit should be instructed to re-determine the geographical position, wherein the positioning circuit is configured to determine the geographical position of the mobile communication device in response to the instruction.

4. The mobile communication device according to claim 3, wherein the location management circuit is further configured to decide when to instruct the positioning circuit to re-determine the geographical position and to instruct the positioning circuit to re-determine the geographical position at a time according to the result of the decision.

5. The mobile communication device according to claim 2, wherein the location management circuit is configured to decide whether the positioning circuit should be instructed to re-determine the geographical position based on a time since the determination of the geographical position.

6. The mobile communication device according to claim 2, wherein the location management circuit is configured to decide whether the positioning circuit should be instructed to re-determine the geographical position based on a desired accuracy of the information about the geographical position.

7. The mobile communication device according to claim 6, wherein the requester is configured to include an indication of a desired accuracy of the information about the geographical position into the request.

8. The mobile communication device according to claim 2, wherein the location management circuit is configured to decide whether the positioning circuit should be instructed to re-determine the geographical position based on an allowed delay of the provision of the information about the geographical position.

9. The mobile communication device according to claim 8, wherein the requester is configured to include an indication of an allowed delay of the provision of the information about the geographical position.

10. The mobile communication device according to claim 2, wherein the location management circuit is configured to decide whether the positioning circuit should be instructed to re-determine the geographical position based on a priority of the requester.

11. The mobile communication device according to claim 1, wherein the location management circuit is configured to instruct the positioning circuit to determine the geographical position of the mobile communication device in response to the other request and the positioning circuit is configured to determine the geographical position of the mobile communication device in response to the instruction.

12. The mobile communication device according to claim 1, wherein the location management circuit is configured to instruct the positioning circuit to determine the geographical position if the location management circuit has decided that the information about the geographical position of the mobile communication device requested by the other requester and the information about the geographical position of the mobile communication device requested by the requester should be based on different determinations of the geographical position of the mobile communication device and wherein the positioning circuit is configured to determine the geographical position of the mobile communication device in response to the instruction to determine the geographical position.

13. The mobile communication device according to claim 1, wherein the location management circuit is configured to provide both the information about the geographical position of the mobile communication device requested by the other requester and the information about the geographical position of the mobile communication device requested by the requester based on the indication of the geographical position of the mobile communication device if it has been decided that the information about the geographical position of the mobile communication device requested by the other requester and the information about the geographical position of the mobile communication device requested by the requester should both be based on the same determination of the geographical position of the mobile communication device.

14. The mobile communication device according to claim 1, wherein the location management circuit is configured to decide whether the information about the geographical position of the mobile communication device requested by the other requester and the information about the geographical position of the mobile communication device requested by the requester should both be based on the same determination of the geographical position of the mobile communication device or whether the information about the geographical position of the mobile communication device requested by the other requester and the information about the geographical position of the mobile communication device requested by the requester should be based on different determinations of the geographical position of the mobile communication device based on a difference between the requested time of provision of the information requested by the other requester and the requested time of provision of the information requested by the requester.

15. The mobile communication device according to claim 1, wherein the location management circuit is configured to decide whether the information about the geographical position of the mobile communication device requested by the other requester and the information about the geographical position of the mobile communication device requested by the requester should both be based on the same determination of the geographical position of the mobile communication device or whether the information about the geographical position of the mobile communication device requested by the other requester and the information about the geographical position of the mobile communication device requested by the requester should be based on different determinations of the geographical position of the mobile communication device based on a desired accuracy of the information about the geographical position.

16. The mobile communication device according to claim 15, wherein the requester is configured to include an indication of a desired accuracy of the information about the geographical position into the request.

17. The mobile communication device according to claim 1, wherein the location management circuit is configured to decide whether the information about the geographical position of the mobile communication device requested by the other requester and the information about the geographical position of the mobile communication device requested by the requester should both be based on the same determination of the geographical position of the mobile communication device or whether the information about the geographical position of the mobile communication device requested by the other requester and the information about the geographical position of the mobile communication device requested by the requester should be based on different determinations of the geographical position of the mobile communication device based on an allowed delay of the provision of the information about the geographical position.

18. The mobile communication device according to claim 17, wherein the requester is configured to include an indication of an allowed delay of the provision of the information about the geographical position.

19. The mobile communication device according to claim 1, wherein the positioning circuit is configured to re-determine the geographical position and the location management circuit is configured to store the indication of the determined geographical position, receive an indication of the re-determined geographical position update the stored indication of the determined geographical position based on the indication of the re-determined geographical position.

20. The mobile communication device according to claim 19, wherein the requester is configured to include an indication of a desired accuracy of the information about the geographical position into the request, the processing includes determining the desired accuracy from the request, the location management circuit is configured to instruct the positioning circuit to determine the geographical position with the determined desired accuracy and the positioning circuit is configured to determine the geographical position with the desired accuracy in response to the instruction.

21. The mobile communication device according to claim 1, comprising a plurality of positioning circuits, wherein the location management circuit is configured to select the a positioning circuit of the plurality of positioning circuits that should determine the geographical position in response to the request and to instruct the selected positioning circuit to determine the geographical position and the positioning circuit is configured to determine the geographical position in response to the instruction.

22. The mobile communication device according to claim 1, comprising a plurality of positioning circuits, wherein the location management circuit is configured to provide a common interface for the requester to request information about the geographical position of the mobile communication device from the positioning circuits.

23. The mobile communication device according to claim 22, wherein the processing of the request includes converting the request from a format according to the common interface to a format required by the positioning circuit.

24. A method for providing positioning information comprising:
   a positioning circuit of a mobile communication device determining the geographical position of the mobile communication device;
   a requester of the mobile communication device generating a request for information about the geographical position of the mobile communication device;
   a location management circuit of the mobile communication device
   receiving an indication of the determined geographical position of the mobile communication device from the positioning circuit;
   receiving the request from the requester,
   processing the request and
   providing information about the geographical position of the mobile communication device based on the result of the processing of the request and based on the indication of the geographical position of the mobile communication device to the requester,
   another requester of the mobile communication device generating another request for information about the geographical position of the mobile communication device,
   receiving the other request from the other requestor,
   providing information about the geographical position of the mobile communication device to the other requestor,
   wherein the request comprises deciding whether the information about the geographical position of the mobile communication device requested by the other requester and the information about the geographical position of the mobile communication device requested by the requester should both be based on the same determination of the geographical position of the mobile communication device or whether the information about the geographical position of the mobile communication device requested by the other requester and the information about the geographical position of the mobile communication device requested by the requester should be based on different determinations of the geographical position of the mobile communication device.

* * * * *